United States Patent
DiChiara, Jr. et al.

(10) Patent No.: US 11,772,821 B2
(45) Date of Patent: *Oct. 3, 2023

(54) METHOD OF USING A THERMAL TRANSFER BLANKET SYSTEM

(71) Applicant: The Boeing Company, Chicago, IL (US)

(72) Inventors: Robert A DiChiara, Jr., Carlsbad, CA (US); Richard W. Burns, Edwardsville, IL (US); Glenn B. Godinho, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/444,577

(22) Filed: Aug. 6, 2021

(65) Prior Publication Data

US 2022/0119129 A1    Apr. 21, 2022

Related U.S. Application Data

(60) Provisional application No. 63/094,323, filed on Oct. 20, 2020.

(51) Int. Cl.
*B64F 5/40* (2017.01)
*B29C 73/10* (2006.01)
(Continued)

(52) U.S. Cl.
CPC ............... *B64F 5/40* (2017.01); *B29C 73/10* (2013.01); *B29C 73/34* (2013.01); *F28D 20/0056* (2013.01); *F28D 2020/0026* (2013.01)

(58) Field of Classification Search
CPC ..... B29C 73/10; B29C 73/34; F28D 20/0056; F28D 2020/0026; B64F 5/40
See application file for complete search history.

(56) References Cited

U.S. PATENT DOCUMENTS 6,036,464 A    3/2000   Heimerdinger et al.
6,270,603 B1   8/2001   Westerman et al.
(Continued)

FOREIGN PATENT DOCUMENTS

EP    3169140 A1    5/2017
EP    3554810 A1    1/2021

OTHER PUBLICATIONS

Wikipedia, "Chromate conversion coating," https://en.wikipedia.org/wiki/Chromate_conversion_coating, downloaded Feb. 10, 2020, 5 pages.
(Continued)

*Primary Examiner* — George R Koch
(74) *Attorney, Agent, or Firm* — MH2 Technology Law Group LLP

(57) ABSTRACT

The present disclosure is directed to a method of repairing an aircraft. The method comprises charging a thermal transfer blanket comprising a thermal energy storage media with thermal energy from a heat source. The method further comprises positioning a thermally curable patch on an exterior surface of an aircraft. The thermally curable patch comprises an uncured polymer having a first temperature. The thermal transfer blanket is applied to the thermally curable patch. Thermal energy is transferred between the thermal transfer blanket and the thermally curable patch to increase the first temperature of the uncured polymer to a cure temperature for a sufficient amount of time to cure the polymer.

19 Claims, 6 Drawing Sheets

(51) Int. Cl.
*B29C 73/34* (2006.01)
*F28D 20/00* (2006.01)

(56) References Cited

U.S. PATENT DOCUMENTS

| | | |
|---|---|---|
| 9,914,269 B2 | 3/2018 | Hopkins et al. |
| 10,213,969 B2 | 2/2019 | Hopkins et al. |
| 10,336,013 B2 | 7/2019 | Kestner et al. |
| 2011/0139769 A1 | 6/2011 | Miller et al. |
| 2015/0217523 A1* | 8/2015 | Shigetomi ............. B29C 35/041 156/499 |
| 2020/0023596 A1 | 1/2020 | Hopkins et al. |
| 2021/0039329 A1 | 2/2021 | DiChiara et al. |
| 2021/0039333 A1 | 2/2021 | DiChiara et al. |
| 2022/0120513 A1* | 4/2022 | DiChiara, Jr. .......... B29C 73/10 |

OTHER PUBLICATIONS

"Care and Repair of Advanced Composites, Second Edition," https://app.knovel.com/web/view/khtml/print.v/rcid:kpCRACE001/cid:k, downloaded on May 13, 2020, 3 pages.
"Structural Repair Manual (SRM) Repair Method Selection," date unknown, pp. 263-264.
Extended European Search Report dated Mar. 21, 2022 in related European Application No. 21203690.9, 7 pages.

* cited by examiner

METHOD OF USING A THERMAL TRANSFER BLANKET SYSTEM

CROSS REFERENCE TO RELATED APPLICATIONS

This patent application claims the benefit of U.S. Provisional Application No. 63/094,323, filed Oct. 20, 2020, the disclosure of which is incorporated herein by reference it its entirety.

DETAILED DESCRIPTION

Field of the Disclosure

The present disclosure is directed to a method of using a thermal transfer blanket to repair the exterior of an aircraft.

BACKGROUND

Coatings, sealants, and composite structures of laminated material are increasingly being used in the aircraft industry. From time to time, the coatings, sealants and composite structures will be damaged and need repair in the field rather than replacement of an entire panel or subassembly. Repair typically involves the removal of damaged material, followed by formation of a patch over the damaged area. Forming the patch includes covering the repair site with organic resin or pre-preg plies (e.g., layers of woven material, such as graphite or carbon fiber, which have been impregnated with an organic matrix resin, such as epoxy). The repairs are cured and in some cases pressed and cured at elevated temperatures. When correctly done, such curing involves a controlled heating profile to a predetermined temperature, which is held for a sufficient time to complete the resin's curing reaction followed by a slow cooling profile.

The advantages of designing with composite materials include the ability to tailor the amount of material used to obtain efficient structural components. Many composite designs have been developed that have non-uniform cross-sections (e.g., ply drop-offs, planks, stiffening elements, etc.). The heat sinks from these non-uniform cross-sections require increased thermal control to maintain uniform cures. Curing of resins used in composite materials (including those in thermally curable patches) is an exothermic reaction that requires heat to start the reaction. Without adequate control of the heating or cooling, hot spots or cold spots develop in the repair. Conventional heat blankets and control techniques that seek to reduce cold spots tend to increase problems associated with hot spots or vice versa. Existing portable repair equipment has neither the desired elevated pressures nor the inherent temperature control capabilities of an autoclave. Consequently, repairs to complex structures are often inadequate because of poor temperature control and non-uniform temperatures in the repair zone, thereby reducing the quality or structural capability of the repair.

Controlling the pressure applied and the temperature profile for a repair is desirable as these can affect the strength of a repair. Inadequate temperature control can substantially impact repair strength. Heating too fast can shock and weaken the composite structure. Curing temperatures lower than desired result in poor bonding and temperatures higher than desired can result in burning both the thermally curable patch and the material surrounding the repair. Fluctuating temperatures, especially during the cure, can produce a combination of these effects.

Curing of organic resin repairs is typically done with electronic heater blankets, IR lamps or electrical convection heaters. Electric heater blankets are the most common approach. However, heater blankets can have problems with non-uniform heating, which can be compounded with the underlying repair site having variations of thickness and spar locations. Monitoring the temperature of the repair site and controlling the power supply to the heater in response to follow a profile or maintain relatively constant temperature to cure the resin without local hot and cold spots can be challenging. This can be especially true in cold environments where the electrical blanket controller can continually attempt to maintain temperature and drive heat into the surrounding structure, thereby unintentionally overheating and potentially thermally damaging underlying layers.

Additionally, there is sometimes a need to heat and cure resin coatings for infield repair of the exterior of an aircraft without a power supply. While an open flame heater may work, open flame heaters are typically not allowed near aircraft, and/or can be dangerous, bulky and provide uneven heating.

SUMMARY

The present disclosure is directed to a method of repairing an aircraft. The method comprises charging a thermal transfer blanket comprising a thermal energy storage media with thermal energy from a heat source. The method further comprises positioning a thermally curable patch on an exterior surface of an aircraft. The thermally curable patch comprises an uncured polymer having a first temperature. The thermal transfer blanket is applied to the thermally curable patch. Thermal energy is transferred between the thermal transfer blanket and the thermally curable patch to increase the first temperature of the uncured polymer to a cure temperature for a sufficient amount of time to cure the polymer.

The present disclosure is also directed to a method of repairing an aircraft. The method comprises charging a thermal transfer blanket, the thermal transfer blanket comprising (i) a flexible container comprising a thermally insulating material and (ii) a thermal energy storage media disposed within the flexible container. Charging the thermal transfer blanket comprises positioning the thermal energy storage media in thermal communication with an aircraft engine, thermal energy being transferred from the aircraft engine to the thermal energy storage media. The method further comprises positioning a thermally curable patch on an exterior surface of an aircraft. The thermally curable patch comprises an uncured polymer having a first temperature. The thermal transfer blanket is applied over the patch. Thermal energy is transferred between the thermal transfer blanket and the thermally curable patch to increase the first temperature of the uncured polymer to a cure temperature for a sufficient amount of time to cure the polymer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

Figure 1:
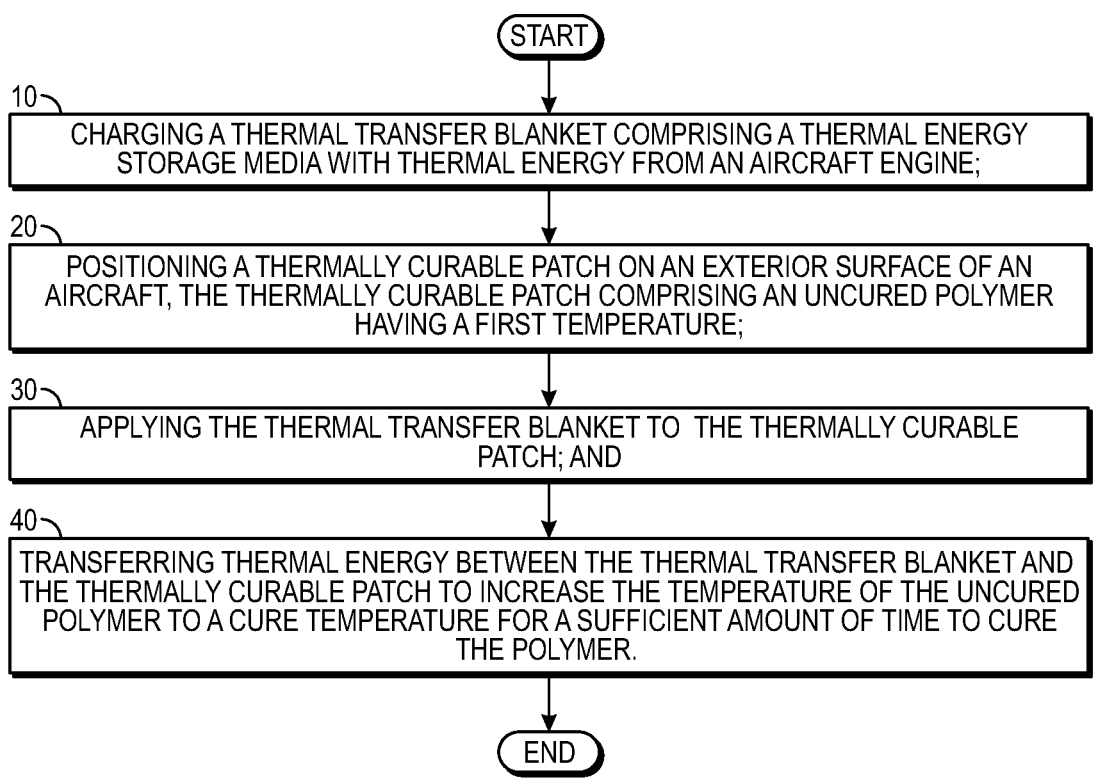
FIG. 1 illustrates a flowchart of a method of using a thermal transfer blanket, according to an example of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The method of the present disclosure provides the ability to repair, for example, coatings, sealants and/or thermal set composites on the exterior of an aircraft. For example, the method can be used to heat adhesive, sealant, prepreg or other organic resin-containing repair materials to achieve a reasonable temperature to cure the organic resin at high temperatures, such as, for example, 120° F. or above. The devices employed are easily portable and can be used to repair coatings in the field (e.g., outdoors or in remote locations without an accessible electrical power source) and in situations where the resin is initially at low temperatures, such as 20° F. or lower.

Figure 2:
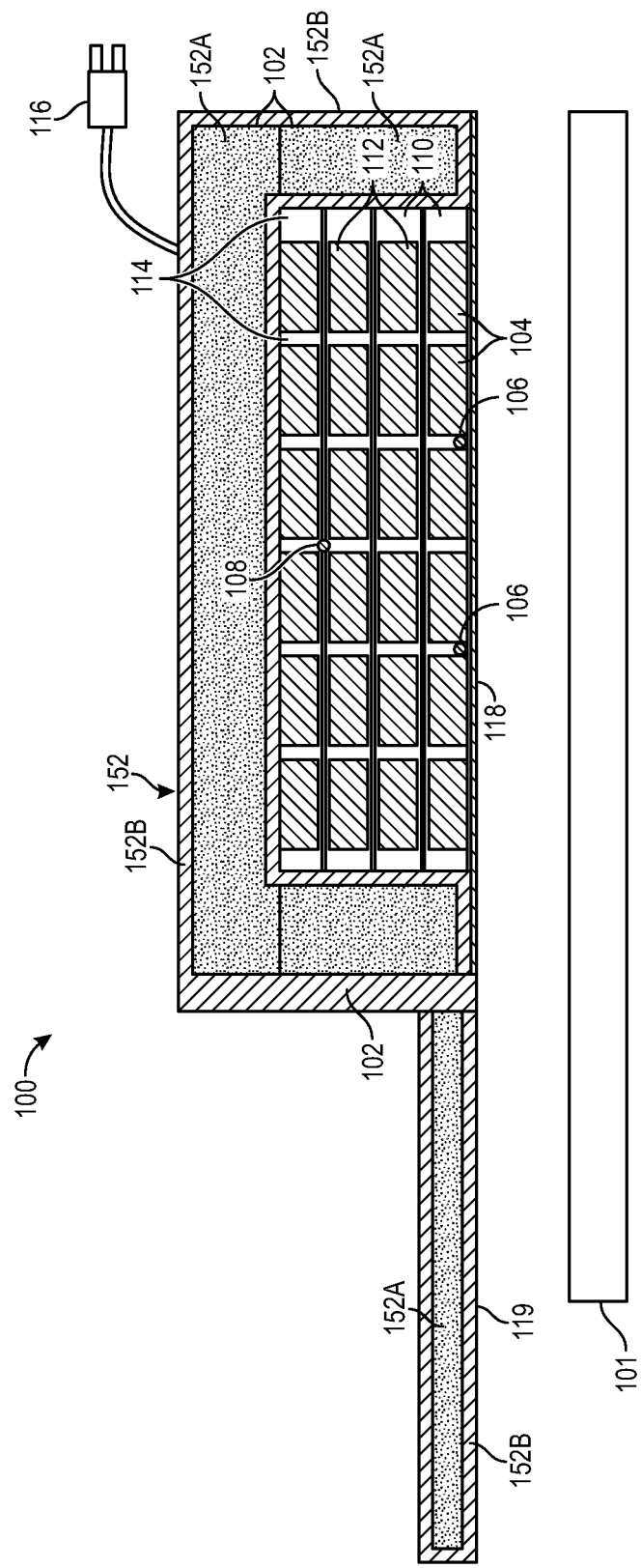
FIG. 2 illustrates a schematic, cross-sectional side view of a thermal transfer blanket, according to an example of the present disclosure.

FIG. 1 shows a flowchart of a method of repairing an aircraft, according to the present disclosure. Referring to 10 of FIG. 1, the method includes charging a thermal transfer blanket with thermal energy from an aircraft engine surface. An example of a thermal transfer blanket 100 is shown in FIG. 2. The thermal transfer blanket 100 comprising a thermal energy storage media 104 that stores thermal energy that is transferred from the aircraft engine surface. As described at 20 of FIG. 1, the method further comprises positioning a thermally curable patch on an exterior surface of an aircraft. An example of a thermally curable patch 200 will be described in more detail below with reference to FIG. 7. The thermally curable patch 200 comprises an uncured polymer, as is well known in the art. Charging the thermal transfer blanket can occur before, after and/or simultaneously with positioning the thermally curable patch on the aircraft. After charging, the thermal transfer blanket 100 is applied to the thermally curable patch, as described at 30 of FIG. 1. As shown at 40 of FIG. 1, thermal energy is transferred between the thermal transfer blanket 100 and the thermally curable patch 200 to increase the temperature of the uncured polymer of thermally curable patch 200 to a cure temperature for a sufficient amount of time to cure the polymer. In this manner, a thermal transfer blanket 100 that is not electrically powered for generating heat is used to effect a repair of an aircraft.

FIG. 2 illustrates a thermal transfer blanket 100 that can be used in the method of FIG. 1. Thermal transfer blanket 100 comprises a flexible container 102 comprising a thermally insulating material 152. A thermal energy storage media 104 is disposed within the flexible container 102. One or more thermocouples are optionally in thermal communication with the thermal energy storage media 104.

The flexible container 102 can comprise any suitable thermal insulating material 152. The thermal insulating material 152 maintains thermal energy within the thermal energy storage media 104 so as to reduce unwanted heat loss, as well as protects users from burns that could occur by touching the thermal energy storage media 104. Examples of suitable thermal insulating materials 152 include a ceramic batting 152A that can withstand process temperatures of up to 1700° F. or higher, such as alumina batting, and a layer of fabric 152B comprising glass, such as fiberglass, that surrounds the ceramic batting 152A. Other examples of thermally insulating materials include foam insulation that can withstand process temperatures to which the thermal transfer blanket will be exposed, such as, for example, temperatures ranging from about 300° F. or more, such as about 300° F. to about 600° F., or about 300° F. to about 450° F. Examples of such foam insulating materials include foams comprising silicone.

The thermal energy storage media 104 comprises a material that acts as a heat sink for storing and releasing thermal energy. Suitable materials can comprise, for example, at least one material chosen from metal oxide or non-oxide ceramics, such as AlN, BeO, BN (either cubic BN or hexagonal BN), diamond and $Al_2O_3$, and combinations thereof. The thermal conductivities and specific heat capacities for some of these materials are shown in Table 1, below. Materials such as AlN and BeO, which have relatively high thermal conductivities and specific heat capacities will be able to store relatively large amounts of thermal energy per unit mass, while also being capable of transferring the thermal energy quickly, either for purposes of storing or releasing the thermal energy. An example of a commercially available material is SHAPAL HI-M SOFT™, made by Tokuyama Corporation of Tokyo, Japan, which is a hybrid combination of AlN and BN, and which is easily machined into complex shapes and therefore will potentially have advantages for some designs.

TABLE 1

| THERMAL PROPERTIES | AlN | BeO | Al2O3 |
|---|---|---|---|
| THERMAL CONDUCTIVITY (W/m-K) | 170-200 | 209-330 | 35 |
| SPECIFIC HEAT CAPACITY (J/kg · K) | 740 | 750-1020 | 880 |
| DIELECTRIC CONSTANT |  | 9.7 | 6.1-7.5 |

Figure 4:
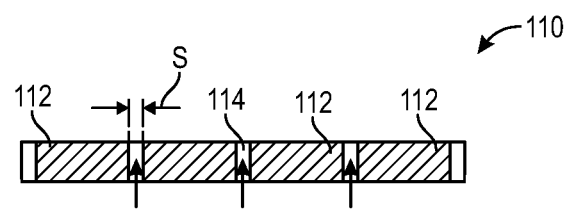
FIG. 4 shows a schematic, cross-sectional side view of a layer of tiles bonded together by an elastomeric polymer that can be used as thermal energy storage media, according to an example of the present disclosure.
Figure 5:
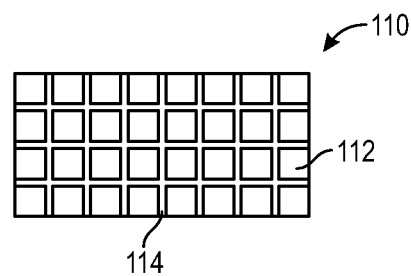
FIG. 5 shows a schematic, angled top-down view of a layer of tiles bonded together by an elastomeric polymer that can be used as thermal energy storage media, according to an example of the present disclosure.

The thermal energy storage media 104 employed in the thermal transfer blanket 100 of FIG. 1 comprises at least one layer 110 of tiles 112. The tiles 112 in each layer 110 are spaced apart and bonded together by an elastomeric polymer 114, which allows for flexibility of the thermal transfer blanket. Referring to FIG. 4, the spacing, S, between the tiles 112 within the same layer can range, for example, from about 0.02 inch to about 0.1 inch, such as about 0.04 inch to about 0.08 inch. FIG. 5 shows an angled top down view of an example of a layer 110. Spacing the tiles relatively close together can increase the packing density of the tiles, thereby increasing the amount of thermal energy that can be stored by each layer 110. On the other hand, spacing the tiles too close together may reduce the flexibility of the layer 110, which may in turn, reduce the flexibility of the thermal transfer blanket 100.

The elastomeric polymer 114 can be any polymer that is flexible and can withstand relatively high temperatures of at least 120° F. In an example, the elastomeric polymer can withstand temperatures of 300° F. or higher, such as 400° F. to 650° F., or 550° F. to 610° F. An example of such an elastomeric polymer is silicone. An example of a commercially available silicone is 3145 RTV, available from Dow Corning of Midland, Michigan. In an example, the elastomeric polymer 114 is a cross-linked silicone. The tiles 112 can be treated with a primer, such as DOWSIL™ PR-1200 silicone primer, commercially available from Dow Chemical, prior to applying the silicone so that the silicone will adhere to the tiles.

The one or more layers 110 of tiles 112 can be attached to the flexible container 102 using any suitable attachment technique. An example of a suitable attachment technique comprises sewing the adhesive to the flexible container 102 using, for example, a glass or other suitable thread. Another example of a suitable attachment technique comprises employing an adhesive, such as silicone, to attach the layers 110. For example, any of the silicones taught herein can be employed as the adhesive. In an example, the layers 110 can be attached to the flexible container 102 only at an end of each of the layers 110, which can provide for flexibility of the thermal transfer blanket 100. In an example, the two or more layers 110 of tiles 112 are also not attached directly to each other, thereby providing increased flexibility for the thermal transfer blanket 100.

In an alternative example, the layers 110 can be allowed to float freely within the flexible container 102. In this example, thermally transparent layer 118 can act to enclose and retain the layers 110 within the flexible container 102. The thermally transparent layer 118 can be in direct thermal communication with the thermal energy storage media 104. Thermally transparent layer 118 is made of a material that can allow the thermal energy stored in the thermal energy storage media 104 to be released through the thermally transparent layer 118. For example, the thermally transparent layer 118 can be sufficiently thin (e.g., 0.001 inch to 0.01 inch thick, such as about 0.005 inch thick) so as to allow ready transfer of heat therethrough. If desired, the thermally transparent layer 118 can also be non-stick in order to avoid sticking to the object being heated. A commercial example of such a non-stick material is ARMALON®, which is a non-porous TEFLON (a polytetrafluoroethylene) coated fiberglass fabric that is known for use in composite fabrication.

The thermal transfer blanket 100 can comprise any desired number of layers 110 of the thermal energy storage media 104. For example, thermal transfer blanket 100 can comprise about 1 to about 10 of the layers 110, such as about 2 to about 6 of the layers 110. The number of layers can be chosen to provide a desired amount of thermal energy storage capacity for the thermal transfer blanket 100 and the thickness of the layers 110. The thickness of each layer 110 can be any suitable thickness, such as about 0.1 inch to about 1 inch, or about 0.15 inch to about 0.25 inch, or about 0.0157 inch. The thicker the layers 110 are, the fewer that may be used to achieve a desired thermal energy storage capacity. However, using larger numbers of thin layers can provide for a more flexible thermal transfer blanket than using fewer numbers of thicker layers to achieve the same thermal energy storage capacity. While the thermal energy storage media 104 employed in the thermal transfer blanket 100 has been described as comprising layers 110 of tiles 112, other thermal energy storage media can also optionally be employed. For example, conductive pellets or conductive plates, such as pellets or plates comprising aluminum, can be employed in place of or in addition to the layers of tiles described herein.

In an example, the thermal transfer blankets described herein include at least one thermocouple. For instance, thermocouples 106, 108 can be arranged as shown in FIG. 2. One or more thermocouples 106 are positioned proximate an outer surface of the thermal energy storage media 104 to measure the temperature proximate the outer surface, which can provide data approximating the temperature at a thermally curable patch surface as an example. One or more thermocouples 108 are positioned within the thermal energy storage media 104 away from the outer surface to measure the temperature within the inner volume of the thermal storage media 104. The data provided by the thermocouples can be useful for monitoring the surface temperatures of the object being heated, as well as for providing feedback as to when the thermal energy storage media 104 is sufficiently charged with thermal energy, or alternatively, when the thermal energy stored within the thermal energy storage media 104 is fully discharged. For example, collected data of the temperature difference between thermocouples 106 and 108 over time can be used to calculate heating rate, predict thermal energy charge times and can be used for monitoring the temperature at the interface and within the device for the amount of heat or cold storage remaining. A thermocouple plug 116 can be used to connect the thermocouples to a device (not shown), such as a handheld, battery powered computer as an example, for calculating outputs based on the data and displaying the outputs to a user.

Figure 6:
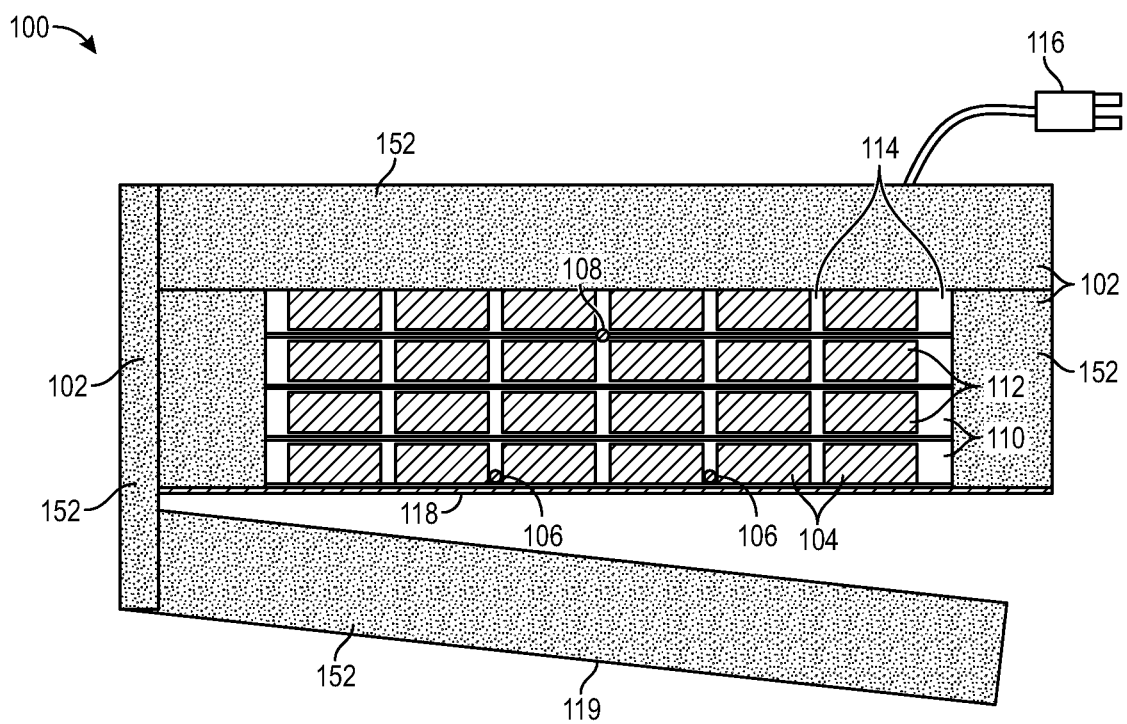
FIG. 6 illustrates a schematic, cross-sectional side view of a thermal transfer blanket, according to an example of the present disclosure.

FIG. 2 further illustrates a heat storage flap 119 that can optionally be attached to the flexible container 102 of the thermal transfer blanket 100. Heat storage flap 119 can comprise a thermal insulation material 152, such as any of the thermal insulation material 152 taught herein for flexible container 102. Heat storage flap can be opened, as illustrated in FIG. 2, when the thermal transfer blanket 100 is being charged with thermal energy and/or is being used to heat an object. As shown in FIG. 6, heat storage flap 119 can be closed so as to cover the thermally transparent layer 118 and/or the thermal energy storage media 104, thereby fully enclosing the thermal energy storage media 104 within the insulated enclosure of flexible container 102 and heat storage flap 119 so as to more efficiently maintain thermal energy within the thermal energy storage media 104.

In an example, any of the methods of the present disclosure further comprise applying a thermal resistive pad 150 to the surface of the thermally curable patch 200, the thermally resistive pad 150 being positioned between the thermal transfer blanket 100 and the thermally curable patch 200. A method of using the thermal transfer blankets 100 and optionally the thermal resistive pads 150 will now be described in detail with reference to FIGS. 2 and 7. In particular, FIG. 2 shows a thermal transfer blanket 100 used to heat a thermally curable patch 200 for repairing an aircraft 210 that comprises a composite material.

The method can comprise positioning the thermal energy storage media 104 of the thermal transfer blanket 100 in thermal communication with a heat source 101 (FIG. 2) having a suitably high temperature, such as a temperature ranging from about 120° F. to about 1700° F., or about 120° F. to about 600° F. An example heat source is an engine, such as for example, an aircraft engine. The thermal energy storage media 104 is then charged as thermal energy is transferred from the aircraft engine 101 to the thermal energy storage media 104 until the thermal energy storage media 104 reaches a desired temperature. For example, the thermal energy storage media 104 can be heated during the charging to a temperature ranging from about 120° F. to about 600° F. These temperatures provide a reasonable temperature at which to cure the organic resins employed in many repair materials, while not being so high as to damage the materials from which the thermal transfer blanket is made. Any other heat source on the aircraft can be used in place of or in addition to the aircraft engine. For example the heat source can include heated exhaust parts, such as the engine exhaust nozzle, engine exhaust deck or bleed air exhaust. Other heat sources separate from the aircraft could also be used.

The amount of energy stored in the thermal transfer blanket will be a function of the specific heat capacity of the thermal energy storage media, as well as the mass and the temperature of the thermal energy storage media after charging is complete. Examples of specific heat capacity for the thermal energy storage media can range from about 120 J/KgK to about 1500 J/KgK, such as about 700 J/KgK to about 1200 J/KgK. The larger the specific heat capacity, the greater the amount of thermal energy that can be stored for a given mass of thermal storage media. The actual amount of thermal energy stored can vary widely. The larger the thermal conductivity of the thermal energy storage media, the faster the rate at which thermal energy can be transferred to and from the thermal transfer blanket. As an example, the thermal conductivity can be 30 W/M·K or more, such as about 150 W/M·K to about 400 W/M·K.

Figure 7:
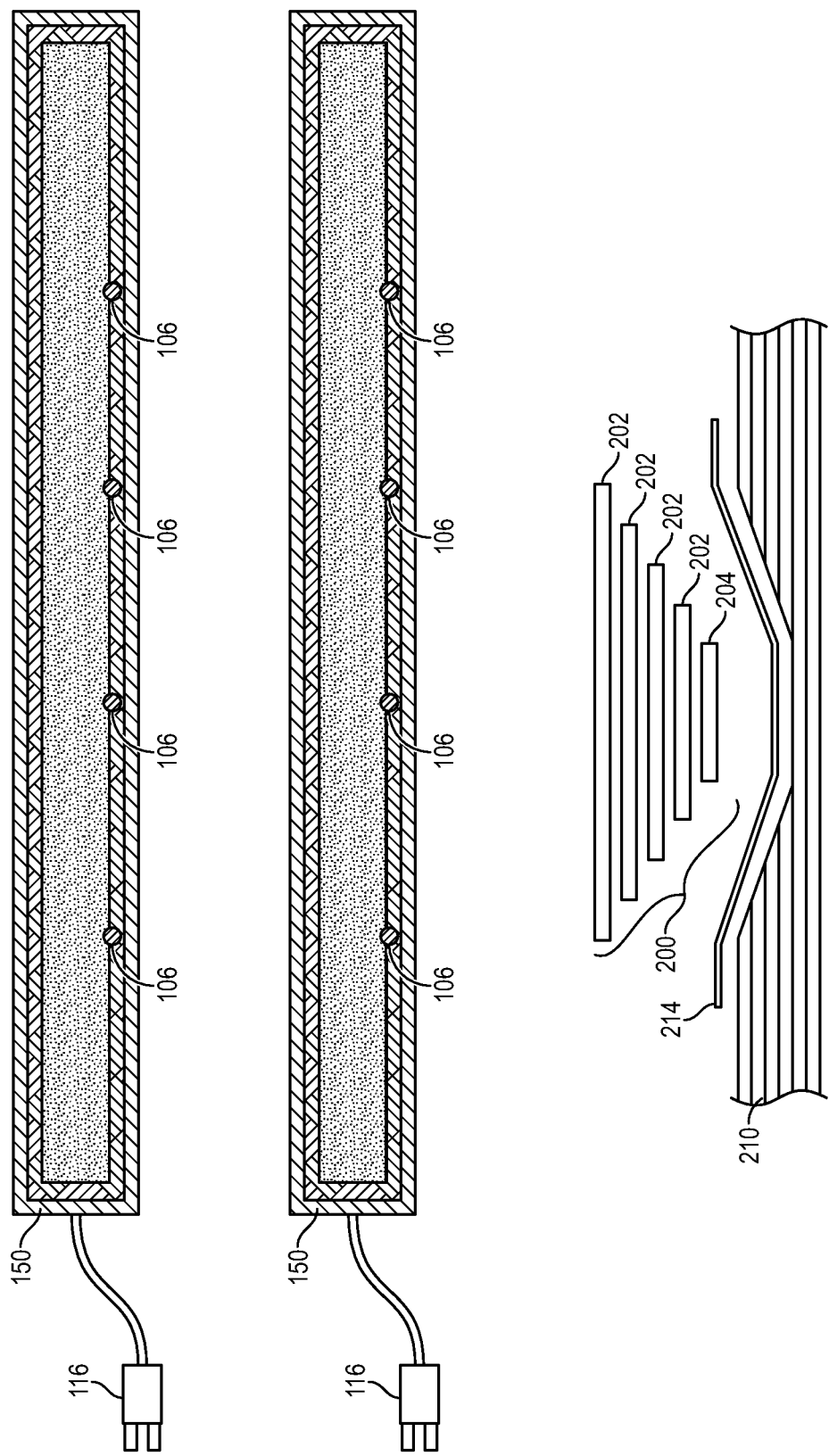
FIG. 7 illustrates a schematic, cross-sectional side view of two thermal resistive pads optionally used during a cure of a thermally curable patch on an aircraft, according to an example of the present disclosure.

FIG. 7 shows an example of a patch 200 that comprises one or more plies of a fibrous material pre-impregnated with a resin (referred to herein as pre-preg plies 202). One or more filler plies 204 can optionally be employed with the pre-preg plies 202 as part of the patch 200, as is well known in the art. An adhesive film 214 can be applied to the surface of the aircraft 210 between the aircraft 210 and the patch 200. Scarfing, or taper sanding, of the damaged composite surface may be carried out prior to application of the patch, as is well known in the art, so as to provide adequate load transfer between the patch and the composite when the repair patch is bonded to the composite.

Figure 3:
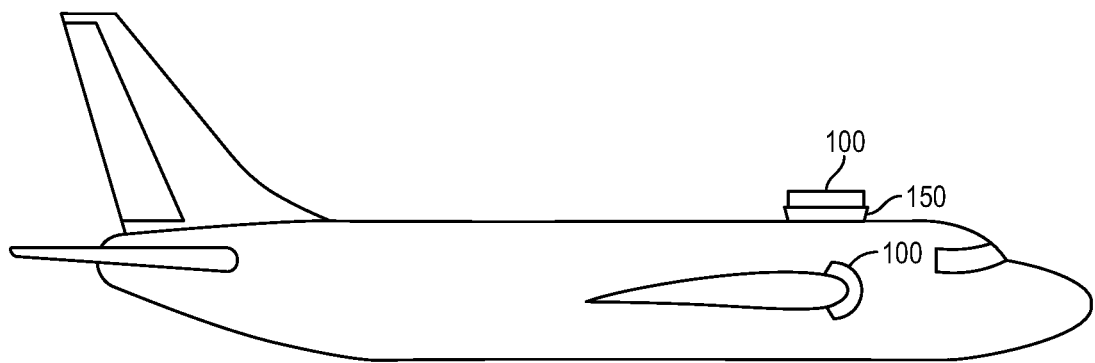
FIG. 3 shows a schematic side view of thermal transfer blankets applied to the surface of an aircraft for the purpose of curing patches, according to an example of the present disclosure.

The thermal transfer blanket 100 is charged with thermal energy and then is positioned on the patch 200 to for a time sufficient to provide the thermal energy to the patch for curing. One or more thermal resistive pads 150 can optionally be applied between the thermal transfer blanket 100 and the patch 200 if a reduced temperature (compared to the temperature of the thermal energy storage media 104) is desired at the surface of the patch 200. As the thermal energy storage media 104 of the thermal transfer blanket cools, the thermal resistive pads 150 can incrementally be removed over time to maintain a desired temperature at the surface of the patch 200. FIG. 3 shows examples of thermal transfer blankets 100 applied to surfaces of an aircraft for the purpose of curing patches (not shown), both with and without a thermal resistive pad 150. After curing is complete, the thermal transfer blanket 100 and optional thermal resistive pads can be removed from the patch 200. The thermal transfer blanket 100 can be sufficiently flexible so as to allow the same thermal transfer blanket to be employed on both flat and contoured surfaces, as shown in FIG. 3.

Figure 8:
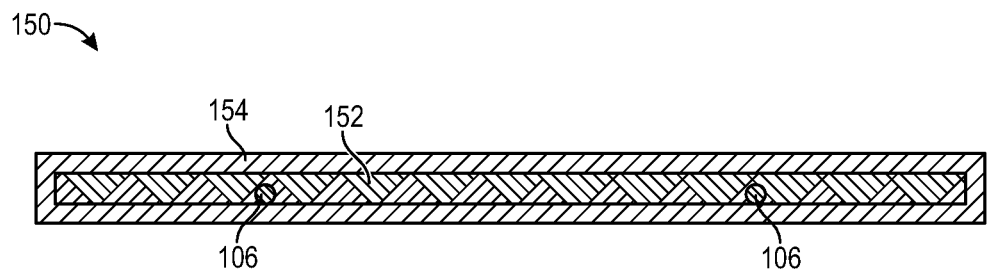
FIG. 8 illustrates a schematic, cross-sectional side view of a thermal resistive pad, according to an example of the present disclosure.
Figure 9:
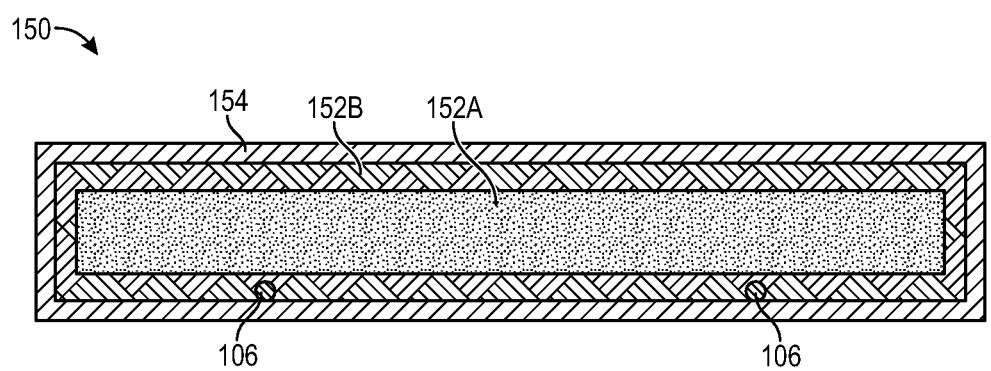
FIG. 9 illustrates a schematic, cross-sectional side view of a thermal resistive pad, according to an example of the present disclosure.
Figure 10:
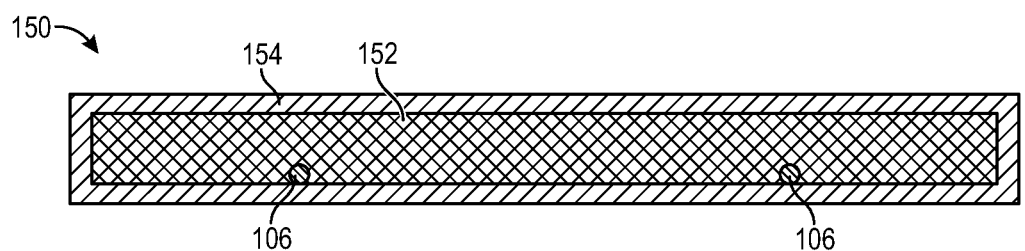
FIG. 10 illustrates a schematic, cross-sectional side view of a thermal resistive pad, according to an example of the present disclosure.

FIGS. 8 to 10 illustrate thermal resistive pads 150 that can be employed with a thermal transfer blanket as described herein. The thermal resistive pads 150 comprise a thermal insulating material 152 and a shell layer 154 surrounding the thermal insulating material 152. As an example, the thermal insulating material 152 comprises a material chosen from a fabric comprising glass, a ceramic batting, a foam, and combinations thereof. The particular insulating material 152 or combination of materials that are employed will depend on the degree of thermal insulation desired and the temperatures the thermal resistive pad 150 will be exposed to, among other things. For example, the fabric comprising glass can be employed when relatively small amounts of thermal insulation are desired in order to provide increased heat transfer, while the ceramic batting an foam can be employed when relatively large amounts of thermal insulation are desired in order to provide reduced heat transfer compared to the heat transfer that would be achieved when employing the fabric comprising glass. If desired, one or more layers of fabric comprising glass can be employed in combination with the foam or ceramic batting to achieve still larger amounts of thermal insulation to provide reduced heat transfer compared to the heat transfer that would be achieved when employing either the foam or ceramic batting without the additional layer of fabric comprising glass. FIG. 8 illustrates an example of a thermal resistive pad 150 wherein the thermal insulating material 152 is a fabric comprising glass, such as fiberglass. The shell layer 154 in FIG. 8 comprises a fabric comprising glass, such as fiberglass, optionally coated with a non-stick coating. The non-stick coating can be a fluoropolymer, for example, polytetrafluoroethylene (e.g., TEFLON®). An example of a commercially available fabric for shell layer 154 is ARMALON®, which is a non-porous polytetrafluoroethylene coated fiberglass. The shell layer 154 can withstand temperatures of at least 120° F., such as about 300° F. to about 650° F. or higher. In applications with process temperatures over 650° F., the fabric will generally not employ polytetrafluoroethylene. For example, the fabric can be made with S-glass (a woven fiberglass) or from ceramic fibers, such as Nextel 312, 720 or 610, made by 3M of Saint Paul, Minnesota. Thermocouples 106 can optionally be arranged in the pads if desired, as shown in FIGS. 8 to 10. For example, one or more thermocouples 106 can be positioned proximate an outer surface of the thermal resistive pads 150.

FIG. 9 illustrated an example of a thermal resistive pad 150 wherein the thermal insulating material 152 comprises a ceramic batting 152A, such as alumina batting, and a layer of fabric 152B comprising glass, such as fiberglass, that surrounds the ceramic batting 152A. The layer of fabric 152B is a separate layer from the shell layer 154 and can be employed to contain the ceramic batting 152A independently of the shell layer 154 (e.g., in the event the shell layer 154 is removed), as well as to provide additional thermal insulation. The layer of fabric 152B can be the same or a different material as the shell layer 154. In an example, the shell layer 154 can be the same as that described above for FIG. 8.

FIG. 10 illustrates an example of a thermal resistive pad 150 wherein the thermal insulating material 152 comprises a foam, such as silicone foam. The shell layer 154 can be the same as that described above for FIG. 8.

The thermal resistive pad 150 can be employed as a stand-alone pad that is separate from the thermal transfer blankets described herein. Alternatively, at least one thermal resistive pad 150 can be attached to the thermal transfer blanket 100. For example, one or more of the thermal resistive pads 150 can be attached to the flexible container 102 of any of the thermal transfer blankets 100, either in place of, or in addition to, the heat storage flap 119. In an example, the heat storage flap 119 comprises at least one thermal resistive pad 150, such as 2 to 4 of any of the thermal resistive pads 150 of FIG. 8, 9 or 10, or any combination thereof.

The thermal resistive pads 150 can be made of any number of flexible insulating materials and can be stacked between the thermal transfer blankets and a thermally curable patch to reduce the thermal transfer rate. When the thermal storage device is fully charged it may too hot (or cold) and a particular thermal energy transfer rate maybe desired. A thermal resistive pad or pads can be placed between the thermal transfer blanket and the thermally curable patch to reducing thermal energy transfer rate. During heating or cooling, thermal resistive pads can be added or removed to maintain the heating rate as the thermal transfer blanket is depleted, or to speed up the heating rate or limit the repair to a maximum temperature. Thermal couples on the thermal resistive pads and the thermal transfer blanket can be monitored and/or data recorded with a battery operated handheld device to facilitate proper cure repair.

The methods of the present disclosure have been described herein as using a thermal transfer blanket to repair the exterior of an aircraft. However, the methods could also be employed to repair other vehicles using any desired heat source for charging the thermal transfer blanket.

EXAMPLES

Example 1—Curing Prepreg by Heat Transfer from Aluminum Plate

A plate of aluminum about ½" thick was put in an oven at 350° F. to absorb the heat. The aluminum plate was used in the experiment to roughly approximate the use of the thermal energy storage media employed in the thermal transfer blankets of the present disclosure. The hot plate was placed on top of a piece of frozen prepreg (which specified a cure temperature greater than about 250° F. for at least about 90 min. for curing). A layer of ARMALON and woven glass fabric (acting as a thermal resistive pad) was positioned between the prepreg and the heated aluminum. The heat from the aluminum cured the prepreg.

Example 2—Example Calculation of Thickness for Thermal Blanket

The thickness for the blankets of the present disclosure will depend on the specific heat capacity and thermal capacity of the materials employed to make the blanket, as well as the amount of energy it will take to raise the temperature of the material to be repaired. Specific Heat Capacity ($C_e$) is the heat required to raise the temperature of a mass of substance by 1° C. Thermal capacity (Q) is a materials ability to absorb or release heat. $Q=m \times C_p (T_1-T_2)$ where m is mass (Kg), T is temperature (° K)

For instance, if a PMC area to be repaired is 10"×10"×0.5" thick, assuming a PMC density of 1.6 g/cc, the PMC to be repaired would have a mass of approximately 1.311 Kg. Assuming the PMC is at a temperature of 20° F. (266° K), is to be heated to 150° F. (339° K) and that the PMC had a $C_p$ of 1110 J/Kg-K then the amount of heat energy (Q) it would take to raise the PMC to the desired temperature is = 1.311 Kg×1110 J/Kg-K (339 K−266 K)=106, 230 J.

Assuming the thermal blanket is made of AlN, is at 300° F. (422° K), has a specific heat of 740 J/Kg-K and that the thermal blanket is to loose heat to 150° F., then the amount of mass of AlN to achieve a Q of 106,230 J is 106,230 J/(740 (422-339))=1.72 Kg of AlN. Assuming the AlN has a density of 3.26 g/cc and the AlN is a panel of 10" square, then the thickness of the AlN would be about 0.32" or 8.128 mm thick. At a packing density 85.9% the thickness would be 0.38" or 9.7 mm.

To account for heat transfer losses could make the heating storage blanket of AlN larger than the calculated size, (e.g. double), which would be about 0.6" or 16 mm. As an example, if had 0.6" thick AlN storage medium blanket that was 10" square and was broken up to have 85.9% packing factor. It would be 51.5 cubic inches or 844.6 cc. It would weigh 2.75 Kg (6 lbs).

If you were to heat the mass of the thermal blanket to 400° F. on an engine and allowed it to cool to 120° F. (an example minimum temp to cure the composite), it would be able to release 228,051 Joules, as calculated by the thermal capacity equation is $Q=m \times C_p (T_1-T_2)=2.75$ Kg×740×(477.6K−339K)=228,051 Joules.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function.

Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of repairing an aircraft, the method comprising:
   charging a thermal transfer blanket comprising a thermal energy storage media with thermal energy from a heat source;
   positioning a thermally curable patch on an exterior surface of an aircraft, the thermally curable patch comprising an uncured polymer having a first temperature;
   applying the thermal transfer blanket to the thermally curable patch; and
   transferring thermal energy between the thermal transfer blanket and the thermally curable patch to increase the first temperature of the uncured polymer to a cure temperature for a sufficient amount of time to cure the polymer; and
   wherein the thermal energy storage media comprises a material chosen from AlN, BeO, BN, diamond, Al2O3, and combinations thereof.

2. The method of claim 1, wherein the thermal energy storage media comprises AlN.

3. The method of claim 1, wherein the heat source is an aircraft engine and charging the thermal transfer blanket comprises:
   positioning the thermal energy storage media in thermal communication with the aircraft engine; and
   charging the thermal energy storage media by transferring thermal energy from the aircraft engine to the thermal energy storage media.

4. The method of claim 3, wherein the thermal energy storage media is heated during the charging to a temperature ranging from about 120° F. to about 600° F.

5. The method of claim 1, wherein the thermal transfer blanket comprises:
   a flexible container comprising a thermally insulating material; and
   the thermal energy storage media disposed within the flexible container.

6. The method of claim 5, wherein the thermally insulating material comprises a fiberglass fabric shell filled with a ceramic batting.

7. The method of claim 5, wherein the thermally insulating material comprises foam comprising silicone.

8. The method of claim 5, wherein the thermal energy storage media comprises one or more layers of tiles, the tiles in each layer being bonded together by an elastomeric polymer.

9. The method of claim 8, wherein the tiles comprise at least one material chosen from AlN, BeO, BN, diamond and Al$_2$O$_3$, and combinations thereof.

10. The method of claim 8, wherein the elastomeric polymer comprises silicone.

11. The method of claim 5, wherein the thermal transfer blanket further comprises a heat storage flap attached to the flexible container.

12. The method of claim 1, further comprising determining a temperature proximate to a surface of the thermally curable patch.

13. The method of claim 1, wherein the thermal transfer blanket further comprises a thermally transparent layer in direct thermal communication with the thermal energy storage media.

14. The method of claim 13, wherein the thermally transparent layer comprises fiberglass coated with a fluoropolymer.

15. The method of claim 1, further comprising applying a thermal resistive pad to the surface of the thermally curable patch, the thermally resistive pad being positioned between the thermal transfer blanket and the thermally curable patch.

16. A method of repairing an aircraft, the method comprising:
   charging a thermal transfer blanket comprising (i) a flexible container comprising a thermally insulating material and (ii) a thermal energy storage media disposed within the flexible container, wherein charging the thermal transfer blanket comprises positioning the thermal energy storage media in thermal communication with an aircraft engine, thermal energy being transferred from the aircraft engine to the thermal energy storage media;
   positioning a thermally curable patch on an exterior surface of an aircraft, the thermally curable patch comprising an uncured polymer having a first temperature;
   applying the thermal transfer blanket over the patch; and
   transferring thermal energy between the thermal transfer blanket and the thermally curable patch to increase the first temperature of the uncured polymer to a cure temperature for a sufficient amount of time to cure the polymer; and
   wherein the thermal energy storage media comprises one or more layers of tiles, the tiles in each layer being bonded together by an elastomeric polymer.

17. The method of claim 16, wherein the tiles comprise at least one material chosen from AlN, BeO, BN, diamond and Al$_2$O$_3$, and combinations thereof.

18. The method of claim 17, wherein the thermal transfer blanket further comprises a thermally transparent layer in direct thermal communication with the thermal energy storage media.

19. The method of claim 16, further comprising applying a thermal resistive pad to the surface of the thermally curable patch, the thermally resistive pad being positioned between the thermal transfer blanket and the thermally curable patch.

* * * * *